Sept. 11, 1928.

J. R. BRUECKNER ET AL 1,684,169

APPARATUS FOR LAP WELDING

Filed March 26, 1925    2 Sheets-Sheet 1

INVENTORS
Julius R. Brueckner
Homer L. Clark

BY

ATTORNEY.

Sept. 11, 1928.
J. R. BRUECKNER ET AL
1,684,169
APPARATUS FOR LAP WELDING
Filed March 26, 1925    2 Sheets-Sheet 2
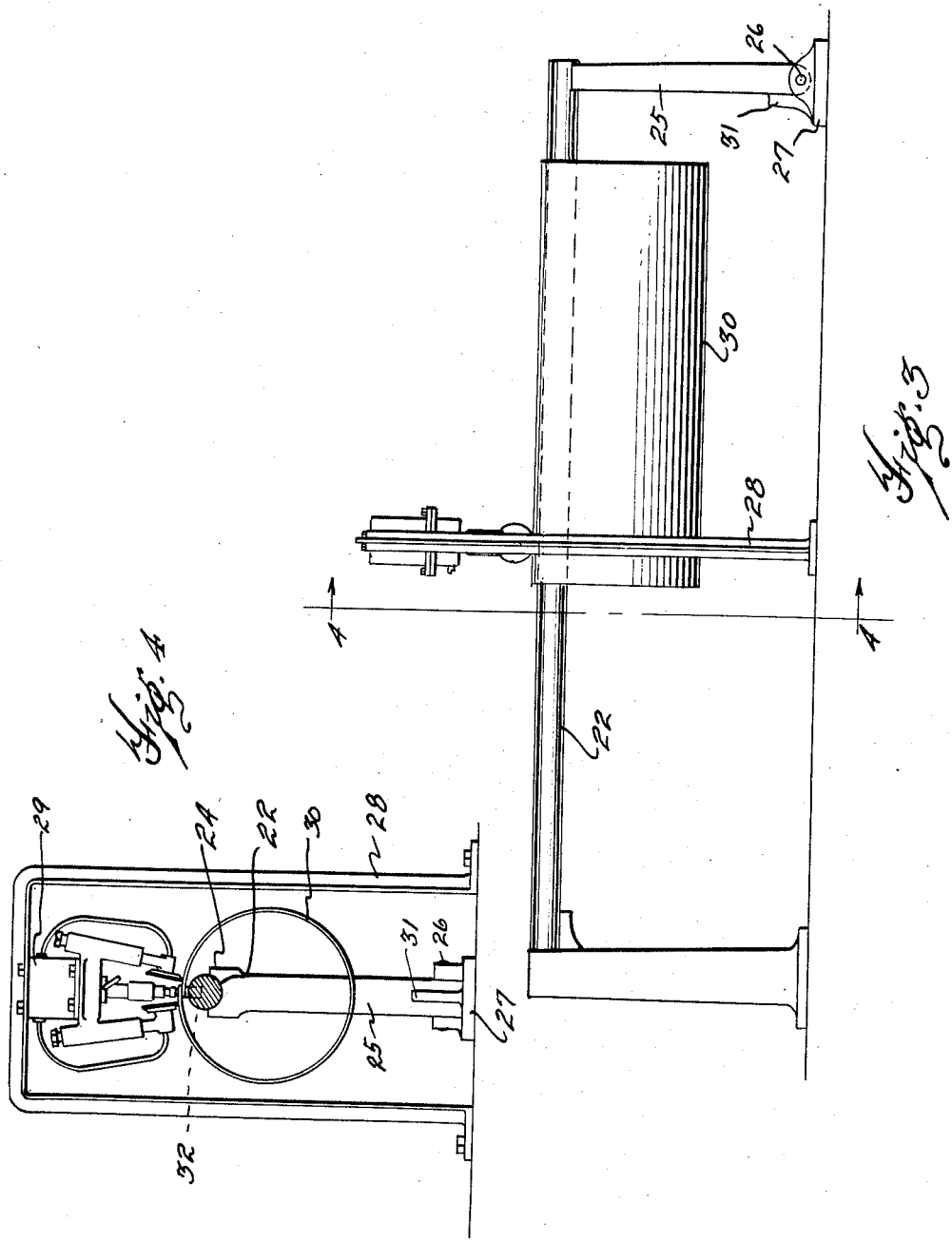
INVENTORS
Julius R. Brueckner
Homer Y. Clark
BY
ATTORNEY.

Patented Sept. 11, 1928.

1,684,169

UNITED STATES PATENT OFFICE.

JULIUS R. BRUECKNER AND HOMER L. CLARK, OF BAY CITY, MICHIGAN, ASSIGNORS TO GIBB WELDING MACHINES COMPANY, OF BAY CITY, MICHIGAN, A CORPORATION OF MICHIGAN.

APPARATUS FOR LAP-WELDING.

Application filed March 26, 1925. Serial No. 18,356.

This invention relates to methods of welding sheet metal and the particular object of the invention is to provide a method of welding the overlapped metal edges together. Essentially the method consists of rolling the sheet metal to form a tube in which the edges of the metal overlap or in providing metal plates with overlapping edges, the overlapped edges being continuously fed beneath a pair of electrodes, the current passing from one electrode to the other through the overlapping surfaces of the plate and due to the resistance to current flow produced by the relatively poor contact, the surfaces of the metal plate at the point of contact are brought to the proper degree of heat and are fed through an automatic air hammer which forms a strong tight weld.

One of the principal objects of the invention is to provide a means for welding a tank or a sheet metal tube formed by bringing a metal sheet to circular form with the edges overlapping and then welding the overlapping edges to provide a tight seam and eliminating the necessity of using rivets to provide a tight seam or joint.

Another object of the invention is to provide a method of welding sheet metal plates in which the magnetic effect of the metal being welded on the secondary circuit is constant irrespective of the mass.

A further object of the invention is to provide a method of welding sheet metal in which the electrodes are positioned on one side only of the metal so that the quantity of metal being welded has no detrimental magnetic influence on the circuits for the electrodes.

These objects and the several novel features of the invention are hereinafter more fully described and claimed and the preferred form of construction by which these objects are attained is shown in the accompanying drawings in which—

Fig. 3 is an elevation of an alternative type of machine operating on the same principle.

Fig. 4 is a section taken on line 4—4 of Fig. 3.

Figure 1:
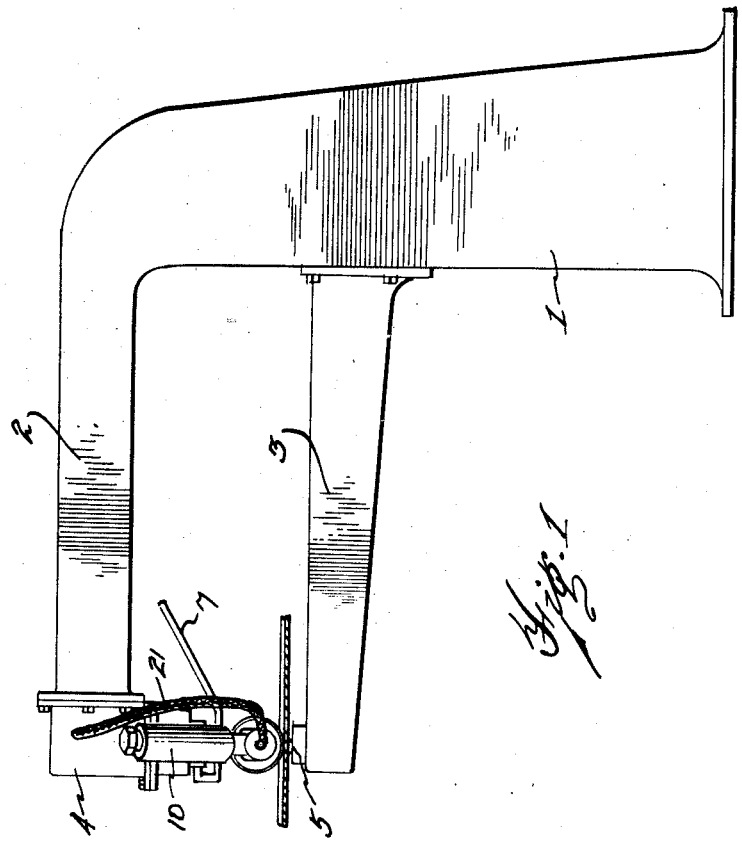
Fig. 1 is a side elevation of the welding machine embodying our invention.

As shown in Fig. 1 a standard 1 is provided having an extending arm 2 formed integrally therewith. An arm 3 is secured to the standard 1 and extends in parallel spaced relation with the arm 2 and supports an anvil 5 in the outer end thereof. The arm 2 is provided with a head 4 which contains an electric transformer and supports an air hammer 6 to which compressed air is fed through the tube 7. The head 4 also provides a support for the yoke 8 and the yoke 8 is provided with an extension 9 and 10 on opposite sides thereof. Each extension is provided with a longitudinal aperture 11 in which a shaft 12 is slidably mounted, the shaft 12 being provided with a pin 13 riding in the slot 14 which limits movement of the shaft longitudinally of the aperture 11. A coiled spring 15 is positioned in the aperture 11 and an adjusting screw 16 is threaded into the end of the aperture 11 and provides a means for adjusting the tension of the spring 15 which tends to force the member 12 outwardly until the pin 13 engages the end of the slot 14. A member 17 similar to the member 12 extends from the portion 10 and the member 12 is provided with a rotatable electrode 18 while the member 17 is provided with a rotatable electrode 19, one of the electrodes being positive and the other being negative. The electrode 18 is connected in the transformer circuit by the wire 20 and the electrode 19 is connected in the same circuit by the wire 21.

Figure 2:
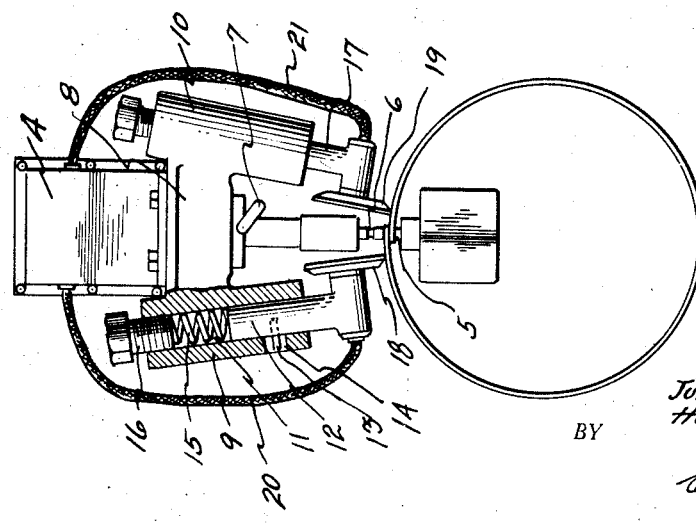
Fig. 2 is an end view thereof.

In operation the metal sheet may be rolled as shown in Fig. 2 so that the edges thereof overlap and the overlapping edges are fed into the machine on the anvil 5 supported on the arm 3, the electrodes 18 and 19 being held in contact with the metal sheet on opposite sides of the lap by the springs 15. As the current passes from one electrode to the other it will take the shortest course which is through the lap instead of around the metal sheet and the overlapping portions of the sheet are thus brought to a white heat, the heat being greatest at the overlapping surfaces where the contact is poorest. It will be noted that the automatic air hammer 6 is positioned between the two electrodes and directly over the part of the sheets which are brought to welding heat by the current passing therethrough. When the overlapping edges have been brought to welding heat the air hammer pounds the said edges together and the seam may be fed continuously beneath the electrodes between the hammer and anvil, the air hammer tightly closing the seam throughout the length of the sheet and if desired hammering down the offset at the lap to the thickness of the remainder of the sheet.

A slightly different form of construction is shown in Figs. 3 and 4 in which a shaft 22 is secured at one end in a standard 23 and the opposite end of the shaft 22 is positioned in a semi-circular notch 24 provided in the standard 25 which is pivotally mounted at 26 to a base member 27. This member 25 may be turned outwardly on the pivot 26 to allow a rolled tube 30 to be slipped onto the shaft 22 at which time the member 25 may be turned back to the position shown in Fig. 3, the stop 31 preventing the member 25 from being turned past the vertical position. An inverted U shaped frame member 28 extends over the shaft 22 as shown in Fig. 4 and supports a transformer case 4 which carries the same parts as the transformer case 4 shown in Figs. 1 and 2. The anvil for the air hammer is set into the shaft 22 as shown by dotted lines 32 in Fig. 4 and as the overlapped edges of the tube 30 are fed along the shaft 22 the electrodes heat the same to a welding heat and the air hammer pounds the seam to provide a strong tight weld. By this construction sheet metal tubes of considerable length may be welded depending on the length of the shaft 22. By the arrangement of the electrodes the metal is not brought between the electrodes and thus does not have any magnetic influence on the circuits so that the current passing between the electrodes is the same irrespective of the mass of the metal being welded. This method of welding may be also applied by mounting the head 29 to ride on an overhead track and arranged so that the contact rolls may ride on the metal being welded, in which case it will not be necessary to move the metal and thus greater lengths may be welded. While we have described this method for the regular lap joint a lap joint in which the edges of the metal are beveled may also be welded by this method.

In either of the forms of the welding device described the metal is moved while current is passed between the electrodes transversely of the overlapped edges and is submitted to the hammering action during movement of the metal. The metal being treated is so moved that due to the rapidity of the hammer blows the areas submitted to the hammer overlap lengthwise of the seam.

From the foregoing description it becomes evident that the device is very simple and efficient in operation, will not easily get out of order, is not affected by the mass of metal being welded and provides a device which accomplishes the objects described.

Having thus fully described our invention, its utility and mode of operation, what we claim and desire to secure by Letters Patent of the United States is—

1. In apparatus for lap welding, an anvil across which the overlapped metal edges may be continuously moved, an electrode on each side of the anvil, yieldable means holding the electrodes in contact with the surface of the metal opposite the anvil on each side of the lap, an automatic hammer positioned between the electrodes and over the anvil and lapped edges, and means for passing the current between the electrodes to heat the joint during the hammering process.

2. In apparatus for lap welding, an anvil across which the overlapped metal edges may be continuously moved, an electrode on each side of the anvil adapted to contact the upper surface of the metal on each side of the lap, an automatic hammer positioned between the electrodes and over the anvil and lapped edges, and means for passing a current between the electrodes to heat the joint during the hammering process.

3. In apparatus for lap welding, an anvil, across which the overlapped metal edges may be continuously moved, an electrode on each side of the anvil, yieldable means holding the electrodes in contact with the metal on each side of the lap, an automatic hammer positioned over the anvil and lapped edges, and means for passing a current between the electrodes to heat the joint during the hammering process.

In testimony whereof we sign this specification.

JULIUS R. BRUECKNER.
H. L. CLARK.